United States Patent
Majonen et al.

(10) Patent No.: US 8,457,188 B2
(45) Date of Patent: Jun. 4, 2013

(54) RECEIVER AND RECEIVING METHOD USING QUALITY MEASURE ESTIMATES

(75) Inventors: Karl Majonen, Hauklpudas (FI); Markku J. Heikkilä, Oulu (FI)

(73) Assignee: Nokia Corporation, Espoo (FI)

( * ) Notice: Subject to any disclaimer, the term of this patent is extended or adjusted under 35 U.S.C. 154(b) by 1257 days.

(21) Appl. No.: 11/823,160

(22) Filed: Jun. 27, 2007

(65) Prior Publication Data

US 2008/0260012 A1 Oct. 23, 2008

(30) Foreign Application Priority Data

Apr. 19, 2007 (FI) .................................. 20075272

(51) Int. Cl.
*H04B 3/46* (2006.01)
(52) U.S. Cl.
USPC .......................................... 375/227; 370/389
(58) Field of Classification Search
USPC .... 375/316, 267, 130, 227; 370/389; 709/223
See application file for complete search history.

(56) References Cited

U.S. PATENT DOCUMENTS

| 2005/0063378 | A1* | 3/2005 | Kadous ......................... 370/389 |
| 2005/0190849 | A1* | 9/2005 | McNamara .................... 375/267 |
| 2006/0013328 | A1 | 1/2006 | Zhang et al. |
| 2007/0005749 | A1* | 1/2007 | Sampath ....................... 709/223 |
| 2007/0010957 | A1* | 1/2007 | Sampath et al. ................ 702/57 |
| 2007/0230608 | A1* | 10/2007 | Li .................................. 375/267 |
| 2008/0130711 | A1* | 6/2008 | Catreux-Erceg et al. ..... 375/130 |

FOREIGN PATENT DOCUMENTS

GB 2 382 748 6/2003
WO WO 2005/015790 2/2005

OTHER PUBLICATIONS

Wiesel et al., "SNR Estimation in Time-Varying Fading Channels", IEEE Transactions on Communications, vol. 54 No. 5, pp. 841-848, May 2006.

\* cited by examiner

Primary Examiner — Leon-Viet Nguyen
(74) Attorney, Agent, or Firm — Mintz, Levin, Cohn, Ferris, Glovsky & Popeo, P.C.

(57) ABSTRACT

An apparatus, including a detection unit configured to perform a non-linear detection on a receive signal, a first estimator configured to estimate a first quality measure based on the receive signal, and a second estimator configured to estimate a second quality measure dependent on the first quality measure and a performance measure of the detection unit is provided.

11 Claims, 2 Drawing Sheets

RECEIVER AND RECEIVING METHOD USING QUALITY MEASURE ESTIMATES

FIELD

Figure 1:
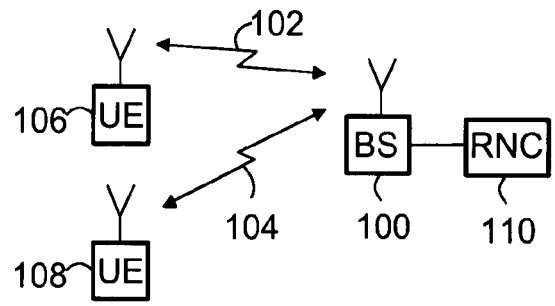

The present invention relates to processing of a signal in a radio system, and in particular to determining of a quality measure of a signal.

BACKGROUND

A wireless communication system includes a radio network and user devices communicating with each other via the radio network. The radio network includes base stations, which implement a bi-directional radio connection with the user devices thereby providing an access interface for the user devices using the radio network.

Examples of cellular access systems include WCDMA (Wideband Code Division Multiple Access) and a so-called 3.9G radio network. Contrary to WCDMA, 3.9G does not apply any spreading or scrambling sequences in base stations, which makes it more difficult to cope with interference from neighbouring base stations. Interference suppression thus becomes a problem for a baseband receiver algorithm. Typically a 3.9G receiver requires at least two receive antennas to make interference suppression work properly. With single antenna transmission linear receivers, such as interference rejection combining (IRC) receivers, can be used. With multiple transmit antennas, more advanced receiver algorithms are required to achieve the adequate performance. Most promising examples of these advanced receivers include iterative interference cancellers and sequence estimators operating in a likelihood-domain.

The user devices move within a network area continuously and thus the signal propagation environment with respect to the base stations changes all the time. Therefore, the quality of the radio connections between a user device and one or more serving base stations has to be monitored continuously as the optimal transmission parameters change accordingly. The most commonly used feedback information is the post-detection Signal to Interference and Noise Ratio (SINR) or a Signal to Noise Ratio (SNR) estimate, which can be used directly in a quantized form or with some other metrics to determine the set of transmission parameters that can be supported in given conditions.

Based on the feedback describing the instantaneous SINR conditions for a certain mobile terminal and based on cell loading and delay sensitivity, for instance, the base station is able to adapt its transmission parameters, such as frequency allocation, modulation or coding rate, accordingly. Such monitoring and change of signal transmission parameters is generally referred to as link adaptation.

The calculation of the SINR is rather straightforward for linear receivers, but can be fairly complex e.g. for likelihood-domain algorithms. In fact, derivation of the post-detection SINR for more advanced receivers can be too time-consuming or computationally complex, or the concept of post-detection SINR may not even be a meaningful measure.

SUMMARY

In an aspect, there is provided an apparatus, comprising a detection unit configured to perform a non-linear detection on a receive signal, a first estimator configured to estimate a first quality measure based on the receive signal, and a second estimator configured to estimate a second quality measure dependent on the first quality measure and a performance measure of the detection unit.

In another aspect, there is provided an apparatus, comprising means for performing a non-linear detection on a receive signal, a first estimating means for estimating a first quality measure based on the receive signal, and a second estimating means for estimating a second quality measure dependent on the first quality measure and a performance measure of the performing means.

In another aspect, there is provided a method, comprising performing a non-linear detection on a receive signal, estimating a first quality measure based on the receive signal, and estimating a second quality measure dependent on the first quality measure and a performance measure of the non-linear detection.

In another aspect there is provided a computer program product encoding a computer program of instructions for executing a computer process for radio system communication, the process comprising performing a non-linear detection on a receive signal, estimating a first quality measure based on the receive signal, and estimating a second quality measure dependent on the first quality measure and a performance measure of the non-linear detection.

In another aspect there is provided a computer program distribution medium readable by a computer and encoding a computer program of instructions for executing a computer process for radio system communication, the process comprising performing a non-linear detection on a receive signal, estimating a first quality measure based on the receive signal, and estimating a second quality measure dependent on the first quality measure and a performance measure of the non-linear detection.

DRAWINGS

Figure 2:
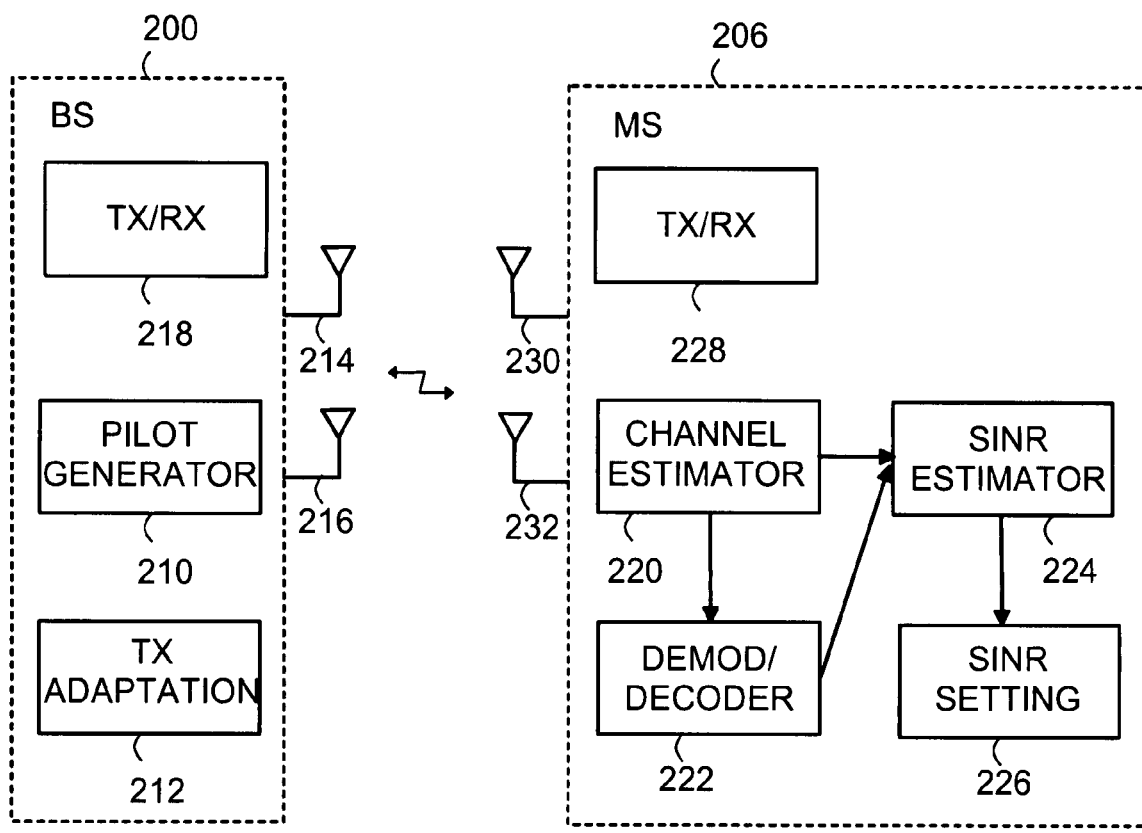
Figure 3:
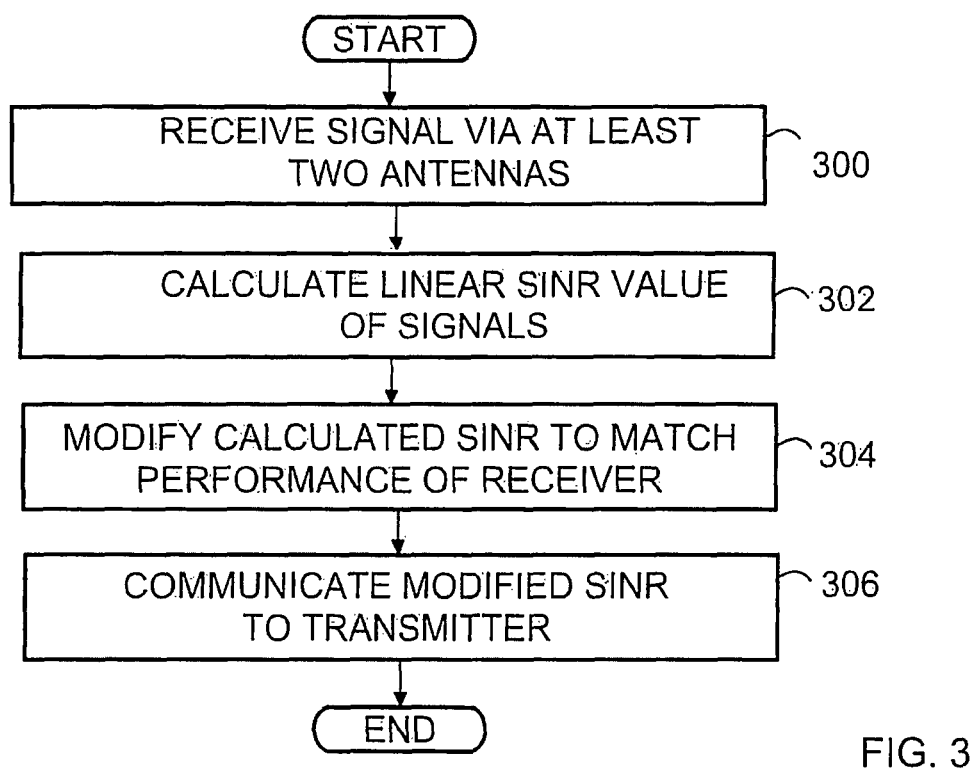

In the following the invention will be described in greater detail by means of preferred embodiments with reference to the attached drawings, in which FIG. 1 shows a communication system;
FIG. 2 shows a base station and a mobile station; and
FIG. 3 shows a method.

DESCRIPTION OF SOME EMBODIMENTS

With reference to FIG. 1, examine an example of a telecommunication system to which embodiments of the invention are applicable. The system in FIG. 1 represents a cellular telecommunication system such as UMTS (Universal Mobile Telephony System). The embodiments are, however, not restricted to these telecommunication systems described by way of example, but a person skilled in the art can apply the instructions to other telecommunication systems containing corresponding characteristics. The embodiments of the invention can be applied, for example, to 3.9G, also referred to as UTRAN LTE (Long Term Evolution) or EUTRAN, and 4G systems or other systems designed to enhance or replace UMTS.

FIG. 1 is a simplified part of a cellular telecommunication system, which comprises a base station or an equivalent network element 100, which has bi-directional radio links 102 and 104 to user transceivers 106 and 108. The user transceivers may be mobile phones, personal data assistants, portable computers, which are equipped with communication capabilities for making/receiving phone calls and/or data. The base station comprises transceivers, which are able to establish bi-directional radio links to the user transceivers. The base station is further connected to a radio network controller or an equivalent network element 110, which transmits the connections of the transceivers to the other parts of the network. The radio network controller controls in a centralized manner several base stations connected to it.

The cellular radio system can also communicate with other networks, such as a public switched telephone network, or the Internet.

FIG. 2 shows an embodiment of a communication system including a first transceiver such as a base station 200 and a second transceiver such as a mobile station 206. FIG. 2 only shows some parts of the transceivers relevant to the present invention.

The base station includes a pilot generator 210. A pilot or a training sequence is a sequence of symbols, known to the transmitter and the receiver, which is inserted to each radio burst transmitted on the radio interface. The receiver uses the training sequence in estimating and correcting channel distortion on the burst.

The base station also includes a communication unit 218 for performing a plurality of tasks before the actual radio transmission, such as insertion of user data to the burst, channel coding, modulation and conversion to a radio frequency. Radio transmission and reception is carried out via one or more antennas, of which two antennas 214 and 216 are shown in FIG. 2.

The mobile station 206 includes one or more antennas 230 and 232 and a communication unit 228 for processing a receive/transmit signal. The communication unit 228 is configured to perform tasks such as digital-to-analogue and analogue-to-digital conversions, and conversions between the baseband signal and the radio frequency signals. In downlink transmission, when multiple transmit antennas are used at the base station and multiple receive antennas in the receiver, it is generally referred as MIMO (multiple input multiple output) transmission. SIMO (single input multiple output) and MISO (multiple input single output) transmissions are the other alternatives, the previous referring to a case where the transmitter has only one antenna and the receiver several antennas, whereas in the latter case the situation is reversed. The conventional method of using only one single antenna at both ends is usually referred to as SISO (single input single output).

The mobile station also includes a channel estimator 220, which estimates distortion caused by the channel in the signal. As output, the channel estimator provides a channel estimate in the form of channel coefficients, for instance.

On the basis of the channel estimate, a decoder module 222 of the mobile station is capable of decoding the transmitted signal where after the signal can be demodulated by performing symbol de-mapping. In FIG. 2, the detection algorithm in the decoder module is non-linear. The detection here refers to symbol estimation of the received signal, including possible interference cancellation. The non-linearity of the detection refers to using of a likelihood domain detector or an iterative interference cancellation where the symbol decisions and possible interference cancellation are performed by using non-linear operations.

Examples of such non-linear detection algorithms are iterative interference cancellers and sequence estimators operating in a likelihood domain such as a QRDM (dynamic QR Decomposition based M-Algorithm) receiver.

The mobile station also includes an estimator 224 for estimating a signal to interference and noise ratio (SINR). The quality estimate may alternatively be a signal to interference ratio (SIR) or some other corresponding measure, for example a modulation and coding scheme combination that can be supported in given conditions.

In case of a single input multiple output (SIMO) interference rejection combining (IRC) receiver, the calculation of post-detection SINR can be shown to be calculation of symbol amplitude at the output of the antenna combiner unit. The received signal after FFT (Fast Fourier Transform) at a certain subcarrier can be presented as $$r = \begin{pmatrix} r_1 \\ r_2 \end{pmatrix} = \begin{pmatrix} h_1 \\ h_2 \end{pmatrix} b + \begin{pmatrix} n_1 \\ n_2 \end{pmatrix} = hb + n,$$

where h is a channel vector formed from the two channel estimates $h_1$, and $h_2$ from the transmitter to the first and second receiver antennas, b is the unknown data symbol, and n is a noise vector. The IRC receiver has an antenna combiner having coefficients $$w = \begin{pmatrix} w_1 \\ w_2 \end{pmatrix} = C_{nn}^{-1} \hat{h},$$

where $C_{nm}^{-1}$ is an inverse spatial noise covariance matrix of the subcarrier in question and $\hat{h}$ is the estimate of the channel vector h.

The IRC antenna combiner output is then given by $$z = w^H r = w_1^* r_1 + w_2^* r_2$$
$$= \underbrace{w^H h b}_{A} + \underbrace{w^H n}_{e} = Ab + e$$

The SINR in this situation is defined as $$SINR = \frac{|A|^2}{\text{Var}(e)} = \frac{|w^H h|^2}{E(|w^H n|^2)} = \frac{|w^H h|^2}{w^H C_{nn} w} \stackrel{w = C_{nn}^{-1} h}{=} \frac{|w^H h|^2}{w^H C_{nn} C_{nn}^{-1} h} = \frac{|w^H h|^2}{|w^H h|} = w^H h.$$

Thus, the receiver in FIG. 2 has a non-linear detection algorithm but the SINR estimation is carried out by a linear algorithm meaning that only linear operations are used to obtain the estimate of the SINR or some other corresponding quality measure.

Thus the SINR estimate obtained by the module 224 using linear operations does not directly reflect the performance of the non-linear decoder 222. Therefore, the mobile station 206 further includes a SINR setting module 226 for adjusting the obtained SINR estimate to take into account the performance of the receiver. The performance of the receiver may be reflected by the performance of the non-linear detection algorithm of the receiver over a linear detection algorithm, for instance.

For this purpose, the SINR setting module 226 may have a one or more lookup/mapping tables stored therein (not shown in FIG. 2), which give the relationship of the measured SINR values and the estimates of the actual values of the non-linear detection algorithm within module 222 corresponding to the measured values. Alternatively, the SINR setting module 226 may calculate a SINR value by performing constant shifting (multiplying) to the measured SINR estimate. The mapping or calculation of the quality measure need not be in the same measure, but the mapping may also be provided from a SINR value to a PER (Packet Error Rate) value or some other measure applied by the communication system.

In addition to the receiver performance, the SINR adjustment may also take into account one or more channel properties, such as (but not limited to) dominant to rest interference ratio (DIR) describing the coloured nature of the interference. For instance, the interference may be taken into account if the channel is strongly frequency selective and the dominant to rest interference ratio is 0 dB. The receiver may have specific mapping tables for each of these different interference situations or the receiver may perform a further adjustment to the SINR value obtained from the comparison of the linear and non-linear receivers.

In an embodiment, the receiver first makes an estimate of the type of interference, and then estimates the performance of the non-linear receiver under the estimated interference type. Then, the SINR value may be estimated by comparing the performance of the linear receiver and the performance of the non-linear receiver under the estimated interference.

The concept of FIG. 2 provides the advantage that there is no need in the receiver to perform complex and time-consuming calculations for obtaining a SINR value. Instead, the SINR value can be obtained by using a simple linear algorithm and can be adjusted on the basis of the performance of the receiver.

The obtained adjusted SINR estimate may be converted to a CQI (Channel Quality Indicator), which may be transmitted by the communication unit 228 from the mobile station to the base station. The base station includes a transmission adaptation module 212, which may adapt the transmission link based on the feedback information of the CQI and other factors. The base station can multiplex different users in time and frequency, and adjust modulation and coding parameters so that the time and frequency resources are effectively utilized.

In another embodiment of an arrangement, the mobile station calculates the SINR value but does not adjust the SINR value itself but sends it (or the CQI, for instance) to the base station. The mobile station may also send to the base station an indicator indicating the performance, such as an indicator indicating the performance of a (non-linear) detection algorithm of the mobile station. The base station may then perform similar adjustment of the SINR value as is carried out by the mobile station's SINR setting module 226 of FIG. 2.

FIG. 3 shows an embodiment of a method. In 300, a signal is received via at least two antennas. The receiver is configured to apply a non-linear detection of the signal.

In 302, a quality measure is calculated of the signal by using a calculation algorithm designed for the linear detector. The quality measure may be a SINR, for instance.

In 304, the calculated SINR is adapted so that it reflects the actual SINR at the output of the non-linear detector, which also reflects the detection performance of the receiver. In addition to the performance of the receiver, the calculated SINR value may also be updated e.g. on the basis of the type of interference.

In 306, the modified SINR or some parameter derivable from the SINR, such as a CQI, is communicated to the transmitter, which may adapt its transmission on the basis of the communicated SINR value, if needed.

In an aspect, there is provided an apparatus for a receiver in a communication system, comprising a processing unit configured to process a multitude of receive channels, an estimator configured to estimate a first quality measure of the signals received on the channels, the estimator being configured to estimate a second quality measure dependent on the first channel quality measure and a performance parameter of the receiver.

The apparatus may be realized on a controller or a processor and associated software or discrete components and an associated logic. The components shown in the mobile station 206 may also be realized on an integrated circuit. The controller or controllers may be configured to perform at least some of the steps described in connection with the flowchart of FIG. 3. The embodiments may be implemented as a computer program comprising instructions for executing a computer process for implementing the method of FIG. 3.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

In an embodiment, the apparatus is configured to process a plurality of receive signals, each of them received via respective receive antennas. The apparatus is configured to form a first quality measure, which may be a post-detection SINR, for instance. The first quality measure may be estimated by using a linear algorithm, such as an IRC (Interference Rejection Combining) based algorithm where the interfering MIMO data streams are considered as additional noise.

In an embodiment, the apparatus is configured to operate in a SISO system that is with a channel transmitted and received by one antenna at each end.

In the apparatus, the detection may be carried out using a non-linear detection algorithm. The performance measure provides a measure of an improved detection performance of the non-linear detection algorithm over a linear detection algorithm. The performance measure may be given as a percentage performance difference between the two, for instance. The performance measure may also be a negative decibel measure in the decibel domain.

In an embodiment, the apparatus may include a mapping table for providing a mapping between the first quality measure of the received signals and the second quality measure, and the estimator is configured to read the estimate for the second quality measure corresponding to the first quality measure from the mapping table on the apparatus. The mapping table may be in the same quality measure, such that the first and second quality measures are given in SINR, for instance. Alternatively, the mapping may be given from the SINR to the PER, for instance. This applies to other ways of mapping between the value of the first quality measure and the second quality measure besides a mapping table. That is, a PER value may be directly calculated from a SINR value by using a predetermined criterion.

In an embodiment, the apparatus comprises a communication unit configured to provide the second quality measure to be communicated to a transmitter transmitting the signals. The quality measure, such as the SINR, may be communicated to a transmitter. Alternatively, another quality measure such as the CQI may be derived from the SINR, and the CQI may be communicated to the transmitter.

In an embodiment, there is provided an apparatus, wherein the estimator is configured to use, in estimating the second quality measure, one or more channel parameters in addition to the performance parameter. Thus, in addition to the performance measure of the non-linear detector, the apparatus may also use one or more channel parameters when estimating the second quality measure. The channel parameter may be an interference parameter, for instance. That is, the second quality measure may be dependent on the performance parameter and an interference parameter. The interference parameter may thus increase/decrease the effect of the performance measure, for instance.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
   at least one processor; and
   at least one memory including computer program instructions, the at least one memory and the computer program instructions configured to, with the at least one processor, cause the apparatus at least to:
   perform a non-linear detection on a received signal;
   determine a first quality measure for the received signal, the first quality measure determined based on at least a linear detection;
   determine, based on at least the first quality measure, a second quality measure, the second quality measure representative of the non-linear detection performed on the received signal, the second quality measure further comprising a value representative of a difference between the non-linear detection and the linear detection; and
   provide the determined second quality measure to facilitate an adaptation of a transmission link.

2. The apparatus of claim 1, wherein the difference represents an improvement corresponding to non-linear detection.

3. The apparatus of claim 1, wherein at least one of the first quality measure and the second quality measure comprise at least one of a signal to interference and noise ratio and a signal to noise ratio.

4. The apparatus of claim 1, wherein the determination of the second quality measure comprises causing the apparatus to utilize one or more mapping tables for providing a mapping between the first quality measure and the second quality measure, the second quality measure corresponding to the first quality measure, the second quality measure read from one or more of the mapping tables.

5. The apparatus according to claim 4, wherein the mapping further comprises mapping based on at least the one or more mapping tables configured to take into account one or more properties of a radio channel used for transmission of the received signal.

6. A method, comprising:
   performing a non-linear detection on a received signal of an apparatus;
   determining a first quality measure for the received signal, the first quality measure determined based on at least a linear detection;
   determining, based on at least the first quality measure, a second quality measure, the second quality measure representative of the non-linear detection performed on the received signal, the second quality measure further comprising a value representative of a difference between the non-linear detection and the linear detection; and
   providing the determined second quality measure to facilitate an adaptation of a transmission link of the apparatus based on the second quality measure estimate.

7. The method of claim 6, wherein the difference represents an improvement corresponding to non-linear detection.

8. The method of claim 6, wherein at least one of the first quality measure and the second quality measure comprise at least one of a signal to interference and noise ratio and a signal to noise ratio.

9. The method of claim 6, wherein the determination of the second quality measure comprises reading a value of the second quality measure from one or more mapping tables, the value of the second quality measure corresponding to a value of the first quality measure and the one or more mapping tables.

10. The method of claim 6, wherein the mapping further comprises mapping based on at least one or more mapping tables configured to take into account one or more properties of a radio channel used for transmission of the received signal.

11. A non-transitory computer readable medium comprising program code which when executed by a processor provide operations comprising:
    performing a non-linear detection on a received signal of an apparatus;
    determining a first quality measure for the received signal, the first quality measure determined based on at least a linear detection;
    determining, based on at least the first quality measure, a second quality measure, the second quality measure representative of the non-linear detection performed on the received signal, the second quality measure further comprising a value representative of a difference between the non-linear detection and the linear detection; and
    providing the determined second quality measure to facilitate an adaptation of a transmission link of the apparatus based on the second quality measure estimate.

* * * * *